US 9,652,338 B2

United States Patent
Bissett et al.

(10) Patent No.: US 9,652,338 B2
(45) Date of Patent: May 16, 2017

(54) DYNAMIC CHECKPOINTING SYSTEMS AND METHODS

(71) Applicant: STRATUS TECHNOLOGIES BERMUDA LTD., Hamilton (BM)

(72) Inventors: Thomas D. Bissett, Shirley, MA (US); Paul A. Leveille, Grafton, MA (US); Srinivasu Chinta, Nashua, NH (US)

(73) Assignee: Stratus Technologies Bermuda Ltd., Hamilton (BM)

( * ) Notice: Subject to any disclaimer, the term of this patent is extended or adjusted under 35 U.S.C. 154(b) by 20 days.

(21) Appl. No.: 14/571,383

(22) Filed: Dec. 16, 2014

(65) Prior Publication Data

US 2015/0205671 A1   Jul. 23, 2015

Related U.S. Application Data

(60) Provisional application No. 61/921,715, filed on Dec. 30, 2013.

(51) Int. Cl.
G06F 11/00 (2006.01)
G06F 11/14 (2006.01)

(52) U.S. Cl.
CPC ............... *G06F 11/1484* (2013.01)

(58) Field of Classification Search
CPC .................................. G06F 11/1484
See application file for complete search history.

(56) References Cited

U.S. PATENT DOCUMENTS 3,736,566 A   5/1973   Anderson et al.
4,590,554 A   5/1986   Glazer et al.
4,751,702 A   6/1988   Beier et al.
4,758,951 A   7/1988   Sznyter, III
4,831,581 A   5/1989   Rubinfeld
(Continued)

FOREIGN PATENT DOCUMENTS

EP   0 750 261 A1   12/1996
EP   0 974 912 A2   1/2000
(Continued)

OTHER PUBLICATIONS

PCT International Search Report and the Written Opinion of the International Searching Authority for International Application No. PCT/US2014/070453, mailed Aug. 21, 2015, 24 pgs.
(Continued)

*Primary Examiner* — Michael Maskulinski
(74) *Attorney, Agent, or Firm* — K&L Gates LLP

(57) ABSTRACT

A method for determining a delay in a dynamic, event driven, checkpoint interval. In one embodiment, the method includes the steps of determining the number of network bits to be transferred; determining the target bit transfer rate; calculating the next cycle delay as the number of bits to be transferred divided by the target bit transfer rate. In another aspect, the invention relates to a method for delaying a checkpoint interval. In one embodiment, the method includes the steps of monitoring the transfer of a prior batch of network data and delaying a subsequent checkpoint until the transfer of a prior batch of network data has reached a certain predetermined level of completion. In another embodiment, the predetermined level of completion is 100%.

5 Claims, 3 Drawing Sheets

(56) References Cited

U.S. PATENT DOCUMENTS

| | | |
|---|---|---|
| 5,099,485 A | 3/1992 | Bruckert et al. |
| 5,155,809 A | 10/1992 | Baker et al. |
| 5,157,663 A | 10/1992 | Major et al. |
| 5,193,162 A | 3/1993 | Bordsen et al. |
| 5,235,700 A | 8/1993 | Alaiwan et al. |
| 5,333,265 A | 7/1994 | Orimo et al. |
| 5,357,612 A | 10/1994 | Alaiwan |
| 5,404,361 A | 4/1995 | Casorso et al. |
| 5,465,328 A | 11/1995 | Dievendorff et al. |
| 5,568,380 A | 10/1996 | Brodnax et al. |
| 5,615,403 A | 3/1997 | Bissett et al. |
| 5,621,885 A | 4/1997 | Del Vigna, Jr. |
| 5,694,541 A | 12/1997 | Service et al. |
| 5,721,918 A | 2/1998 | Nilsson et al. |
| 5,724,581 A | 3/1998 | Kozakura |
| 5,745,905 A | 4/1998 | Larsson et al. |
| 5,787,485 A | 7/1998 | Fitzgerald, V et al. |
| 5,790,397 A | 8/1998 | Bissett et al. |
| 5,802,265 A | 9/1998 | Bressoud et al. |
| 5,892,928 A | 4/1999 | Wallach et al. |
| 5,896,523 A | 4/1999 | Bissett et al. |
| 5,913,021 A | 6/1999 | Masubuchi |
| 5,918,229 A | 6/1999 | Davis et al. |
| 5,923,832 A | 7/1999 | Shirakihara et al. |
| 5,933,838 A | 8/1999 | Lomet |
| 5,948,112 A | 9/1999 | Shimada et al. |
| 5,958,070 A | 9/1999 | Stiffler |
| 5,968,185 A | 10/1999 | Bressoud et al. |
| 6,023,772 A | 2/2000 | Fleming |
| 6,035,415 A | 3/2000 | Fleming |
| 6,067,550 A | 5/2000 | Lomet |
| 6,088,773 A | 7/2000 | Kano et al. |
| 6,098,137 A | 8/2000 | Goodrum et al. |
| 6,105,148 A | 8/2000 | Chung et al. |
| 6,141,769 A | 10/2000 | Petivan et al. |
| 6,158,019 A | 12/2000 | Squibb |
| 6,289,474 B1 | 9/2001 | Beckerle |
| 6,301,677 B1 | 10/2001 | Squibb |
| 6,397,242 B1 | 5/2002 | Devine et al. |
| 6,401,216 B1 | 6/2002 | Meth et al. |
| 6,438,705 B1 | 8/2002 | Chao et al. |
| 6,453,343 B1 | 9/2002 | Housel, III et al. |
| 6,526,447 B1 | 2/2003 | Giammaria |
| 6,622,263 B1* | 9/2003 | Stiffler ............... G06F 11/1469 711/135 |
| 6,678,369 B2 | 1/2004 | DeMent et al. |
| 6,687,849 B1 | 2/2004 | Cherf |
| 6,718,538 B1 | 4/2004 | Mathiske |
| 6,823,474 B2 | 11/2004 | Kampe et al. |
| 6,907,477 B2 | 6/2005 | Altman et al. |
| 6,954,877 B2 | 10/2005 | Earl et al. |
| 6,978,400 B2 | 12/2005 | Hickson et al. |
| 7,039,663 B1 | 5/2006 | Federwisch et al. |
| 7,055,063 B2 | 5/2006 | Leymann et al. |
| 7,058,846 B1 | 6/2006 | Kelkar et al. |
| 7,076,555 B1 | 7/2006 | Orman et al. |
| 7,080,375 B2 | 7/2006 | Martin |
| 7,162,698 B2 | 1/2007 | Huntington et al. |
| 7,206,964 B2 | 4/2007 | Moser et al. |
| 7,240,172 B2 | 7/2007 | Chong, Jr. et al. |
| 7,249,118 B2 | 7/2007 | Sandler et al. |
| 7,289,433 B1 | 10/2007 | Chmara et al. |
| 7,299,337 B2 | 11/2007 | Traut et al. |
| 7,310,721 B2 | 12/2007 | Cohen |
| 7,363,538 B1 | 4/2008 | Kundu et al. |
| 7,380,039 B2 | 5/2008 | Miloushev et al. |
| 7,392,433 B2 | 6/2008 | Sahoo et al. |
| 7,545,752 B2 | 6/2009 | Krautkremer et al. |
| 7,577,934 B2 | 8/2009 | Anonsen et al. |
| 7,603,391 B1 | 10/2009 | Federwisch et al. |
| 7,743,381 B1 | 6/2010 | Tran |
| 7,934,035 B2 | 4/2011 | Miloushev et al. |
| 8,117,496 B2 | 2/2012 | Bashir et al. |
| 8,145,945 B2 | 3/2012 | Lee |
| 8,533,382 B2 | 9/2013 | Scales et al. |
| 8,769,533 B2 | 7/2014 | North |
| 8,806,266 B1 | 8/2014 | Qu et al. |
| 8,812,907 B1 | 8/2014 | Bissett et al. |
| 9,459,895 B2 | 10/2016 | Venkitachalam et al. |
| 2002/0073249 A1 | 6/2002 | French et al. |
| 2002/0073276 A1 | 6/2002 | Howard et al. |
| 2002/0078308 A1 | 6/2002 | Altman et al. |
| 2002/0147890 A1 | 10/2002 | Saulsbury et al. |
| 2003/0005102 A1 | 1/2003 | Russell |
| 2003/0005356 A1 | 1/2003 | Franckowiak et al. |
| 2003/0084376 A1 | 5/2003 | Nash et al. |
| 2003/0163763 A1 | 8/2003 | DeLano |
| 2004/0001435 A1* | 1/2004 | Wong ................ H04L 47/10 370/230 |
| 2004/0010663 A1 | 1/2004 | Prabhu |
| 2004/0143776 A1 | 7/2004 | Cox |
| 2004/0158549 A1 | 8/2004 | Matena et al. |
| 2004/0193658 A1 | 9/2004 | Kawamura et al. |
| 2004/0193945 A1 | 9/2004 | Eguchi et al. |
| 2004/0199812 A1 | 10/2004 | Earl et al. |
| 2004/0267897 A1 | 12/2004 | Hill et al. |
| 2005/0015702 A1 | 1/2005 | Shier et al. |
| 2005/0201373 A1 | 9/2005 | Shimazu et al. |
| 2005/0229039 A1 | 10/2005 | Anderson et al. |
| 2005/0251785 A1 | 11/2005 | Vertes et al. |
| 2005/0256826 A1 | 11/2005 | Hambrick et al. |
| 2006/0047925 A1 | 3/2006 | Perry |
| 2006/0062142 A1 | 3/2006 | Appanna et al. |
| 2006/0112297 A1 | 5/2006 | Davidson |
| 2006/0179147 A1 | 8/2006 | Tran et al. |
| 2007/0027985 A1 | 2/2007 | Ramany et al. |
| 2007/0174484 A1 | 7/2007 | Lussier et al. |
| 2009/0113109 A1 | 4/2009 | Nelson et al. |
| 2009/0193298 A1 | 7/2009 | Mukherjee |
| 2010/0077164 A1 | 3/2010 | Stiffler et al. |
| 2010/0095074 A1 | 4/2010 | Ganesh et al. |
| 2010/0107158 A1 | 4/2010 | Chen et al. |
| 2010/0235591 A1 | 9/2010 | Akutsu et al. |
| 2010/0325500 A1 | 12/2010 | Bashir et al. |
| 2011/0161639 A1 | 6/2011 | Knauth et al. |
| 2011/0167194 A1 | 7/2011 | Scales et al. |
| 2011/0167195 A1 | 7/2011 | Scales et al. |
| 2011/0167196 A1 | 7/2011 | Scales et al. |
| 2011/0167298 A1 | 7/2011 | Lee |
| 2011/0289345 A1 | 11/2011 | Agesen et al. |
| 2011/0289417 A1 | 11/2011 | Schaefer et al. |
| 2012/0011401 A1 | 1/2012 | Ranganathan et al. |
| 2012/0011508 A1 | 1/2012 | Ahmad |
| 2012/0084520 A1 | 4/2012 | Chou et al. |
| 2012/0266018 A1 | 10/2012 | Tanaka |
| 2012/0284721 A1 | 11/2012 | Antani et al. |
| 2013/0024855 A1 | 1/2013 | North |
| 2013/0212205 A1 | 8/2013 | Flockhart et al. |
| 2013/0311992 A1 | 11/2013 | Fuente et al. |
| 2014/0040206 A1 | 2/2014 | Ramakrishnan et al. |
| 2014/0201574 A1 | 7/2014 | Manchek et al. |
| 2014/0215461 A1 | 7/2014 | Laor et al. |
| 2015/0007172 A1 | 1/2015 | Hudzia et al. |
| 2015/0009804 A1 | 1/2015 | Koponen et al. |
| 2015/0082087 A1 | 3/2015 | Jacobs et al. |
| 2015/0095907 A1 | 4/2015 | Jacobs et al. |
| 2015/0127809 A1 | 5/2015 | Akella et al. |
| 2015/0149999 A1 | 5/2015 | Ramanathan et al. |
| 2015/0180761 A1 | 6/2015 | Watanabe |
| 2015/0205672 A1 | 7/2015 | Bissett et al. |

FOREIGN PATENT DOCUMENTS

| | | |
|---|---|---|
| GB | 2 268 817 A | 1/1994 |
| JP | 10-320326 A | 12/1998 |
| JP | 2004-206212 A | 7/2004 |
| WO | 92/17842 A1 | 10/1992 |
| WO | 99/26133 A2 | 5/1999 |

OTHER PUBLICATIONS

International Search Report and the Written Opinion of the International Searching Authority for International Application No.

(56) References Cited

OTHER PUBLICATIONS

PCT/US2014/070456, mailed Jun. 22, 2015, 16 pages.
Clark et al., "Live Migration of Virtual Machines," NSDI '05 2nd Symposium on Networked Systems Design & Implementation, USENIX Association, May 4, 2005, pp. 273-286.
Cully et al., "Remus: High Availability via Asynchronous Virtual Machine Replication," The University of British Columbia, Department of Computer Science, 14 pages.
Kim et al., "Process Allocation for Load Distribution in Fault-Tolerant Multicomputers," IEEE Publication, pp. 174-183, 1995.
Nakamikawa et al., "High Performance Fault Tolerant Computer and its Fault Recovery," 1997 IEEE, pp. 2-6.
Tamura, "Modernization of Kemari using HVM with PV Drivers," Nippon Telegraph and Telephone Corporation, NTT Cyber Space Labs, Nov. 20, 2008, 23 pages.
Tamura et al., "Kemari: Virtual Machine Synchronization for Fault Tolerance," NTT Cyber Space Labs, 2 pages.
Tamura, "Kemari: Virtual Machine Synchronization for Fault Tolerance using DomT," Nippon Telegraph and Telephone Corporation, NTT Cyber Space Labs, Jun. 24, 2008, 19 pages.
Tamura et al., "Virtual Machine Synchronization for High Availability Clusters," Nippon Telegraph and Telephone Corporation, NTT Cyber Space Labs, Apr. 17, 2007, 17 pages.
PCT International Search Report for International Application No. PCT/US06/19754, dated Oct. 17, 2007, 3 pages.
Supplementary European Search Report for Application No. EP 06770856, completed Nov. 10, 2010, 6 pages.
PCT International Search Report and PCT Written Opinion of the International Searching Authority for International Application No. PCT/US2014/070456, mailed Apr. 2, 2015, 9 pages.
International Preliminary Report on Patentability from PCT/US2014/070461 dated Jul. 5, 2016.
International Preliminary Report on Patentability from PCT/US2014/070453 dated Jul. 5, 2016.
International Preliminary Report on Patentability from PCT/US2014/070456 dated Jul. 5, 2016.

\* cited by examiner

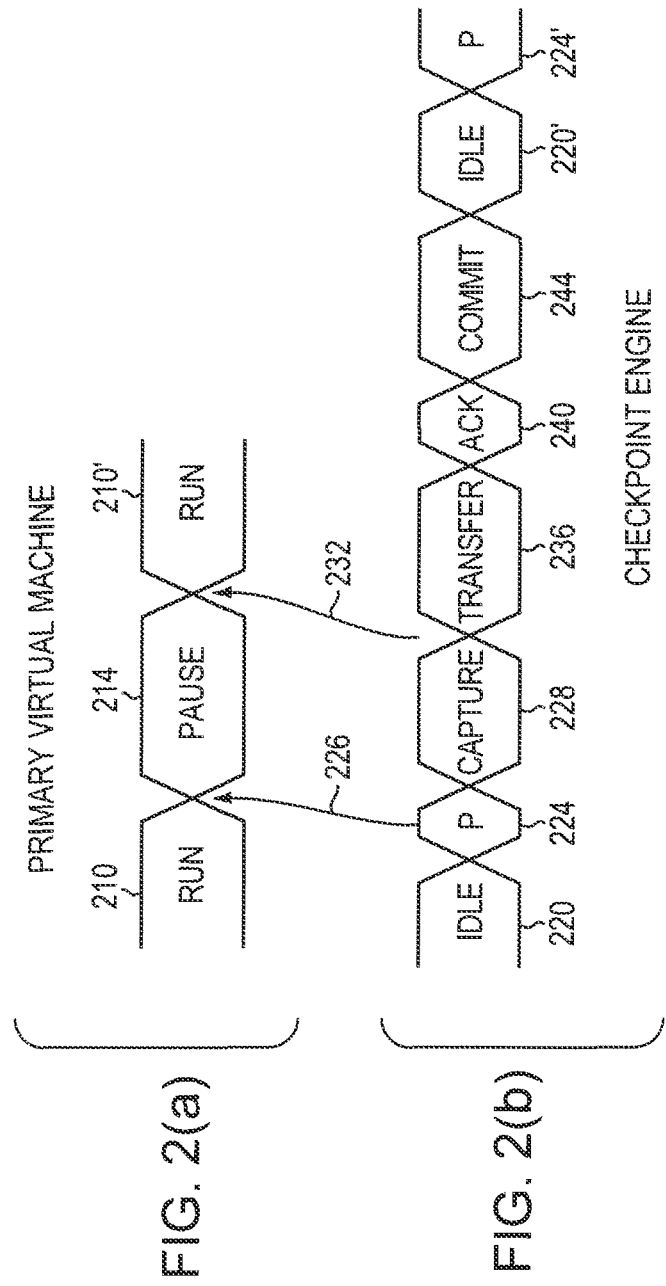

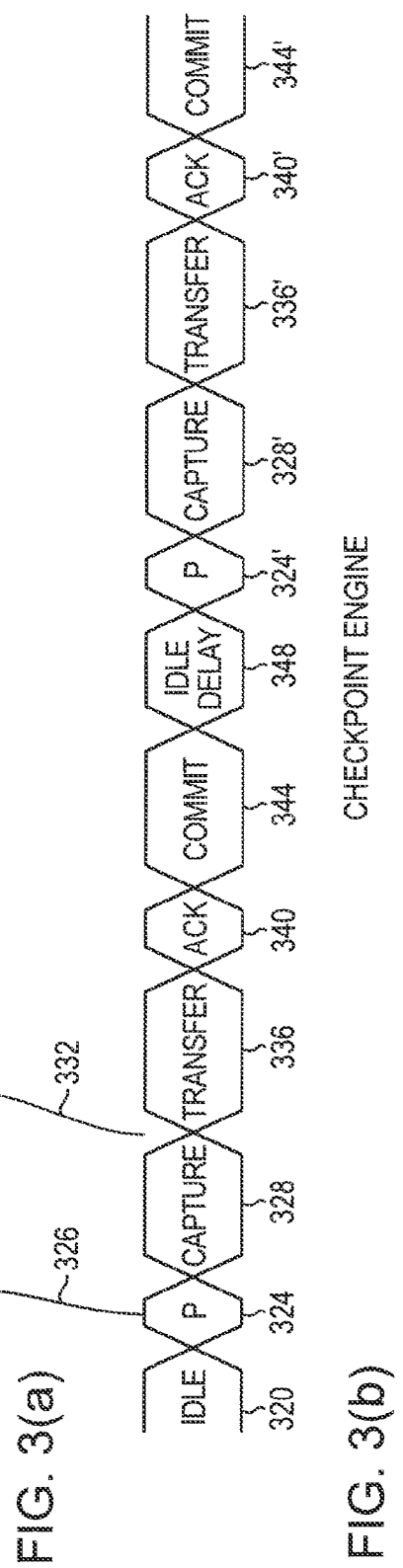

DYNAMIC CHECKPOINTING SYSTEMS AND METHODS

RELATED APPLICATIONS

This application claims priority to U.S. provisional patent application No. 61/921,715 filed on Dec. 30, 2013 and owned by the assignee of the current application, the contents of which are herein incorporated by reference in their entirety.

FIELD OF THE INVENTION

The invention relates generally to the field of fault tolerant computing and more specifically to checkpointing, networking and virtualization systems.

BACKGROUND OF THE INVENTION

There are a variety of ways to achieve fault tolerant computing. Specifically, fault tolerant hardware and software may be used either alone or together. As an example, it is possible to connect two (or more) computers, such that one computer, the active computer or host, actively makes calculations while the other computer (or computers) is idle or on standby in case the active computer, or hardware or software component thereon, experiences some type of failure. In these systems, the information about the state of the active computer must be saved periodically to the standby computer so that the standby computer can substantially take over at the point in the calculations where the active computer experienced a failure. This example can be extended to the modern day practice of using a virtualized environment as part of a cloud or other computing system.

Virtualization is used in many fields to reduce the number of servers or other resources needed for a particular project or organization. Present day virtual machine computer systems utilize virtual machines (VM) operating as guests within a physical host computer. Each virtual machine includes its own virtual operating system and operates under the control of a managing operating system or hypervisor executing on the host physical machine. Each virtual machine executes one or more applications and accesses physical data storage and computer networks as required by the applications. In addition, each virtual machine may in turn act as the host computer system for another virtual machine.

Multiple virtual machines may be configured as a group to execute one or more of the same programs. Typically, one virtual machine in the group is the primary or active virtual machine, and the remaining virtual machines are the secondary or standby virtual machines. If something goes wrong with the primary virtual machine, one of the secondary virtual machines can take over and assume its role in the fault tolerant computing system. This redundancy allows the group of virtual machines to operate as a fault tolerant computing system. The primary virtual machine executes applications, receives and sends network data, and reads and writes to data storage while performing automated or user initiated tasks or interactions. The secondary virtual machines have the same capabilities as the primary virtual machine, but do not take over the relevant tasks and activities until the primary virtual machine fails or is affected by an error.

For such a collection of virtual machines to function as a fault tolerant system, the operating state, memory and data storage contents of a secondary virtual machine should be equivalent to the final operating state, memory and data storage contents of the primary virtual machine. If this condition is met, the secondary virtual machine may take over for the primary virtual machine without a loss of any data. To assure that the state of the secondary machine and its memory is equivalent to the state of the primary machine and its memory, it is necessary for the primary virtual machine periodically to transfer its state and memory contents to the secondary virtual machine.

The periodic transfer of data to maintain synchrony between the states of the virtual machines is termed checkpointing. A checkpoint defines a point in time when the data is to be transferred. During a checkpoint, the processing on the primary virtual machine is paused, so that the final state of the virtual machine and associated memory is not changed during the checkpoint interval. Once the relevant data is transferred, both the primary and secondary virtual machines are in the same state. The primary virtual machine is resumed at the earliest possible point in the process and continues to run the application until the next checkpoint, when the process repeats.

Checkpoints can be determined by either the passage of an upper limit amount of elapsed time from the last checkpoint or sooner by the occurrence of some event, such as: the number of memory accesses (termed dirty pages); the occurrence of a network event (such as network acknowledgement that is output from the primary virtual machine); or the occurrence of excessive buffering on the secondary virtual machine (as compared to available memory) during the execution of the application. An idle primary virtual machine, for instance, would rely on the upper-limit elapsed timer to perform a periodic checkpoint, while a busy machine would likely trigger one of the mentioned events. This event-based approach is considered dynamic or variable-rate checkpointing.

Outbound network traffic can cause an immediate checkpoint cycle to ensure lower-latency exchanges between the primary virtual machine and the computer on the network receiving the transmission from the virtual machine. This is desirable for file-level operations such as folder enumeration, file deletion, attribute manipulation, and even single-threaded transaction exchanges. Under these types of latency-sensitive exchanges, it is desirable to have a rapid and responsive checkpoint rate. Latency-sensitive exchanges such as certain client requests and server responses benefit from a very responsive checkpoint mechanism.

However, excessive checkpointing can lead to performance degradation of the primary virtual machine. In turn, this can result in decreased levels of network throughput, which can compromise the utility of a fault tolerant system. This is particularly likely in an event-based approach when streaming network loads are present.

Adding a fixed minimum delay to each checkpoint cycle is one effective way to improve throughput and, as the delay is increased further, improvement can be obtained under certain streaming-load conditions. However, this type of delay causes harm to the latency-sensitive loads mentioned earlier. In addition, the right delay for one streaming load may not work well for other streaming loads.

Therefore, a need exists for ways to vary the checkpointing of a system dynamically while meeting the requirements of the relevant applications and system users.

Embodiments of the invention address this need and others.

SUMMARY OF THE INVENTION

In one aspect, the invention relates to a method for determining a delay in a checkpoint interval. In one embodiment, the method includes the steps of determining the number of bits to be transferred on the network, determining the target bit transfer rate, and calculating the delay as the number of bits to be transferred divided by the target bit transfer rate. In another embodiment, the delay further includes a minimum delay.

In another aspect, the invention relates to a method for delaying a checkpoint interval. In one embodiment, the method includes the steps of monitoring the transfer of a prior batch of network data and delaying a subsequent checkpoint until the transfer of a prior batch of network data has reached a certain predetermined level of completion. In another embodiment, the predetermined level of completion is 100%.

In another aspect, the invention relates to a computing system. In one embodiment, the computer system includes a first fault tolerant computing device comprising a primary virtual machine and a second computing device, wherein the first computing device and the second computing device are networked, wherein the primary virtual machine comprises a first checkpointing engine and a first network interface, wherein the secondary virtual machine comprises a second network interface, and wherein the first checkpointing engine delays a checkpoint by a delay interval in response to a network parameter. In another embodiment, the network parameter is target network delivery rate. In yet another embodiment the checkpoint delay is canceled in response to the completion of network traffic delivery.

In still another embodiment the checkpoint delay is extended in response to the actual network delivery rate. In one embodiment the checkpoint delay is canceled in response to pending network traffic exceeding the remaining released traffic. In another embodiment, the checkpoint delay interval is equal to a batch size in bits being transferred divided by the target network delivery rate. In yet another embodiment, the first checkpointing engine delays the checkpoint in response to a minimum delay. In still yet embodiment the checkpoint interval delay is equal to a batch size in bits being transferred divided by the target network delivery rate plus an additional minimum delay.

BRIEF DESCRIPTION OF THE DRAWINGS

The structure and function of the invention can be best understood from the description herein in conjunction with the accompanying figures. The figures are not necessarily to scale, emphasis instead generally being placed upon illustrative principles. The figures are to be considered illustrative in all aspects and are not intended to limit the invention, the scope of which is defined only by the claims.

FIGS. 2(a) and (b) are timing diagrams known to the prior art for an embodiment of a virtual machine and a checkpointing engine, respectively.

FIGS. 3(a) and (b) are timing diagrams for an embodiment of a virtual machine and a checkpointing engine, respectively, constructed in accordance with the invention.

DESCRIPTION OF A PREFERRED EMBODIMENT

Figure 1:
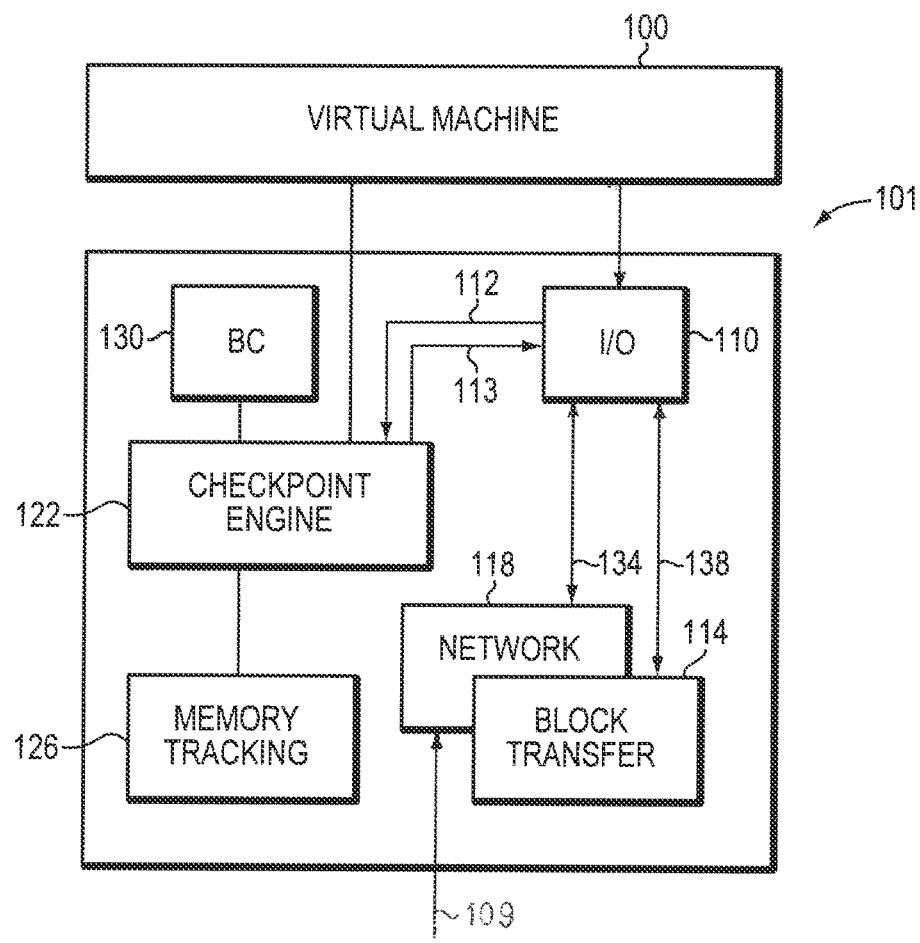
FIG. 1 is a block diagram of an embodiment of a checkpointing engine in a virtual machine constructed in accordance with the invention.

Detailed embodiments of the invention are disclosed herein, however, it is to be understood that the disclosed embodiments are merely exemplary of the invention, which may be embodied in various forms. Therefore, specific functional details disclosed herein are not to be interpreted as limiting, but merely as a basis for the claims and as a representative basis for teaching one skilled in the art to variously employ the invention in virtually any appropriately detailed embodiment.

In a variable-rate checkpoint system, an excessive checkpoint rate can occur when checkpoint cycles are initiated on the primary virtual machine in response to the occurrence of an event on the primary virtual machine. Normally, such an immediate checkpoint cycle ensures low-latency exchanges of checkpoint data between the virtual machines. This could be the case, for instance, with a series of file-level operations such as folder enumeration, file deletion, attribute manipulation, and even single-threaded transaction exchanges. Under these types of latency-sensitive loads, it is desirable to have a rapid and responsive checkpoint rate.

However, many other types of operations result in a streaming transfer of network data from the primary virtual machine to one or more secondary machines. Examples include file transfer (especially of large files), web service transfers, or even multi-threaded transaction processing loads. Under these conditions, the checkpoint rate can escalate quickly to a point where it negatively affects throughput. A high checkpoint rate burdens the primary virtual machine with excessive pause/resume cycles. Further, a high checkpoint rate taxes the memory subsystem and interconnects of the primary machine. In short, the scalability of streaming application network data to a client machine is significantly impeded by such overly aggressive checkpointing.

In brief overview, to address the problem of reducing the latency of checkpointing while providing a flexible checkpoint period, a dynamic method of reducing the checkpoint rate is used. This dynamic method causes the checkpoint rate to be reduced proportionally to the amount of data produced by the most recently completed checkpoint cycle. The method is dynamic in that one or more inputs or parameters such as network-related or other data transfer parameters are used to decrease the checkpoint rate.

Referring to FIG. 1, components of a checkpointing engine 122 with a virtual machine 100 are shown. The virtual machine 100 would typically be connected to a second virtual machine (not shown) to achieve a fault tolerant computing system. The virtual machine 100 includes a checkpoint module 101. The checkpoint module 101 buffers network data 109 in an input/output module (I/O) 110 and a notification event 112 alerts the checkpointing engine 122. Storage data (referred to generically as block-IO) is allowed to move 138 more freely between input/output module (I/O) 110 and the block interface 114. The checkpointing engine 122 is in communication with a memory tracking module 126 and a buffer cache 130. When the checkpointing engine 122 is idle, network data (if any) remains in a buffered state by input/output module (I/O) 110, and will only be released by a signal 113 to input/output module (I/O) 110 after the next checkpoint reaches its commit/release stage. At that time, network data (if any) is transferred 134 from the input/output module (I/O) 110 to the network interface 118. When a checkpoint is declared, the virtual machine 100 is paused and the dirty page data is processed by the checkpointing engine 122.

In more detail and referring to FIG. 2(a), a timing diagram of events and methods occurring in sequence for a primary virtual machine is shown for a checkpoint system. The primary virtual machine is either running (executing the application) (210, 210') or paused (214). The checkpointing engine includes additional timing conditions as shown in FIG. 2(b). The checkpointing engine may be idle (220) until a checkpoint (P) occurs (224) at which time the checkpointing engine pauses (226) the primary virtual machine (214). While the primary virtual machine is paused, the state of the primary virtual machine is captured (228). Capture is a page-copying stage that allows the virtual machine to be resumed and executed in parallel with checkpoint 'transfer' and 'ACK-wait'.

In another embodiment, page-copying is avoided all together and pages are just transferred as they are. In this case, the virtual machine remains paused during the transfer and ACK-wait stages. Combinations of these two approaches may also be used. Once the state data is captured (228), the checkpointing engine resumes (232) the primary virtual machine which again executes the application (210').

The captured state data is then transferred (236) to the secondary virtual machine. Once the data has been transferred, the checkpointing engine waits for an acknowledgement (ACK) to be received (240) from the secondary virtual machine, indicating that the data has been received. At this point, the checkpoint cycle is committed (244) and the buffered network data is released to the network. The checkpointing engine then enters an idle state (220') until the next checkpoint (224') occurs.

When certain triggering events occur, a checkpoint is declared. Some non-limiting examples of checkpoint triggering events are as follows: a timer initiating a checkpoint period, a network event such as an ACK reply being required from the primary virtual machine to another computer on the network, and a write operation to a memory page occurring. Even though a checkpoint is declared and started, additional checkpoint generating events may occur as checkpoint processing nears the completion of a cycle. Thus, rapid events may be queued with each event requiring action by the checkpointing engine causing high overhead to the virtual machine. For example, each subsequent checkpoint will, at a minimum, require a pausing and restarting of the virtual machine, contributing to the time overhead of the system in which the primary virtual machine is not doing useful work.

Referring to FIG. 3(a), the timing of the virtual machine is shown for a checkpoint system according to the present invention. In this embodiment, the primary virtual machine again is either running (executing one or more applications) (310, 310') or the primary virtual machine is paused (314). The checkpointing engine operates under the timing conditions as shown in FIG. 3(b). A number of checkpointing engine timing transitions are the same as shown in FIG. 3(a). For example, the checkpointing engine may be idle (320) until a checkpoint (P) occurs (324), at which time the checkpointing engine pauses (326) the primary virtual machine (314). While the primary virtual machine is paused, the state of the primary virtual machine is captured (328). Once the state data is captured (328), the checkpointing engine resumes (332) the primary virtual machine which again executes one or more applications (310').

The captured state data is then transferred (336) to the secondary virtual machine. Once the data has been transferred, the checkpointing engine waits for an acknowledgement (ACK) to be received (340) from the secondary virtual machine, indicating that the data has been received. The checkpoint data is then committed (344), for example by releasing one or more frames of data to the network.

At this point, the checkpointing engine enters an idle state (348) but in this embodiment, the idle state includes an additional delay period (a checkpoint interval delay, or idle delay) before the next checkpoint (324') is allowed to be declared. This increased total delay permits additional checkpoint events to be queued prior to a checkpoint being declared, thus allowing multiple checkpoint events to be covered by one set of checkpoint operations. This reduces the overhead per event for handling a checkpoint.

The checkpoint interval delay is subject to various competing considerations in the system. For example, the delay introduced prior to pausing the virtual machine cannot be so long that it affects other functions of the virtual machine. For instance, if the virtual machine is in communication with another computer, that other computer may be waiting for a message in response to a transmission the other computer sent to the virtual machine. Any additional delay in the virtual machine's providing of the response message will increase its latency and cause reduced responsiveness.

In one embodiment, the setting of the appropriate delay is achieved by observing the actual network interface of the virtual machine and not allowing the next checkpoint cycle to start until the prior cycle's network data transfer is either complete or reaches some completion threshold. This may become ineffective as a delay mechanism, however, if the data transfer capability of the network is very fast relative to the overhead and cost of the checkpoint system.

In another embodiment, the method calculates the proper delay based on the amount of released data and a target network delivery rate. The checkpoint interval delay is therefore generated by the equation:

$$\text{Checkpoint interval delay} = \text{batch size in bits} / \text{target network delivery rate}$$

For example, a release of 400,000 bits (50,000 bytes) measured against a desired delivery rate of 1 Gbps results in a checkpoint interval delay of 400 μs (400,000 bits × 0.000000001 seconds/bit).

In another embodiment, a minimum ('min') delay can be added to the calculated delay to compensate for the general overhead (latency) in actually starting the network I/O where the checkpoint interval delay='min'+(batch size in bits)/(target network delivery rate)

This checkpoint interval delay benefits the system in several ways. First, the delay does not penalize cycles that release little or no network output. Second, the delay does not carry forward or accumulate delay based on past calculations, which can also penalize loads with varying size bursts of network output. Third, the calculated delay does cause the next checkpoint cycle to be delayed proportionally, giving the virtual machine more time to work toward the next cycle. Fourth, the delay further reduces the time overhead because the virtual machine's streaming output batches grow in accordance with the delay. Fifth, the delay promotes aggregation of network output dynamically with no fixed-delay assumptions. Finally, the resulting delay significantly reduces the checkpoint rate by requiring fewer checkpoints to cover the same number of checkpoint events and thus reduces the burden on the memory and interconnects components, as well as other components that may be involved in processing a checkpoint.

It should be noted that the example of 400,000 bits as a batch size is provided as a non-limiting example. The size and data transfer rate of outbound network batches is unpredictable. With this dynamic delay method, the virtual machine and the checkpoint engine cooperate rather than compete. Thus, in one embodiment, the dynamic selection of a checkpoint interval delay based on monitored parameters allows the checkpoint period to substantially increase or maximize the size of released network batches of network data.

The dynamic delay rate selection method may also limit the duration of the checkpoint interval delay. This protects the system against a virtual machine that quickly accumulates an enormous batch of outbound network traffic, or one that allows data to continue to grow without an imposed limit. An example of this latter point might be a 'network flood' test. Without some limit on the size of the checkpoint interval delay, the delay could continue to grow beyond a practical value.

In another embodiment, a refinement to the basic checkpoint interval delay mechanism is to monitor the amount of pending network traffic as it increases, waiting for the prior cycle's checkpoint interval delay to expire (or the network transmissions to be physically completed). For instance, when the pending traffic exceeds the amount of remaining released traffic, the remaining (current) checkpoint interval delay can be cancelled, allowing an immediate cycle to address the now-greater pending network transmissions. A benefit of this refinement is that it introduces a degree of predictability that allows the startup and execution cost, and latency, of the checkpoint mechanism to be better hidden as it operates in parallel with the delivery of the prior cycle's final portions of the traffic over the network.

Unless specifically stated otherwise as apparent from the following discussion, it is appreciated that throughout the description, discussions utilizing terms such as "processing" or "computing" or "calculating" or "delaying" or "comparing", "generating" or "determining" or "committing" or "checkpointing" or "interrupting" or "handling" or "receiving" or "buffering" or "allocating" or "displaying" or "flagging" or Boolean logic or other set related operations or the like, refer to the action and processes of a computer system, or electronic device, that manipulates and transforms data represented as physical (electronic) quantities within the computer system's or electronic devices' registers and memories into other data similarly represented as physical quantities within electronic memories or registers or other such information storage, transmission or display devices.

The algorithms presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

The aspects, embodiments, features, and examples of the invention are to be considered illustrative in all respects and are not intended to limit the invention, the scope of which is defined only by the claims. Other embodiments, modifications, and usages will be apparent to those skilled in the art without departing from the spirit and scope of the claimed invention.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

It should be understood that the order of steps or order for performing certain actions is immaterial so long as the present teachings remain operable. Moreover, two or more steps or actions may be conducted simultaneously.

It is to be understood that the figures and descriptions of the invention have been simplified to illustrate elements that are relevant for a clear understanding of the invention, while eliminating, for purposes of clarity, other elements. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are intended to be embraced therein.

What is claimed is:

1. A checkpoint computing system comprising:
   a first fault tolerant computing device comprising a primary machine; and
   a second computing device; wherein the first computing device and the second computing device are networked,
   wherein the primary machine comprises a first checkpointing engine and a first network interface,
   wherein the second computing device comprises a second network interface,
   wherein the first checkpointing engine delays a checkpoint by a delay interval, irrespective of network protocol and protocol state information, in response to a number of buffered network bits to be transferred N from the first machine to the second machine and a target bit transfer rate R; and
   wherein the checkpoint delay interval is canceled in response to pending network traffic exceeding remaining released traffic.

2. The checkpoint computing system of claim 1 wherein the checkpoint delay interval is varied in response to the actual network bit transfer rate.

3. The checkpoint computing system of claim 1 wherein the checkpoint delay interval is equal to a batch size in bits N being transferred divided by the target network delivery rate R.

4. The checkpoint computing system of claim 1 wherein the first checkpointing engine delays the checkpoint in response to a minimum delay.

5. The checkpoint computing system of claim 1 wherein the checkpoint interval delay is equal to a batch size in bits being transferred, divided by the target network delivery rate, plus an additional minimum delay.

* * * * *